United States Patent Office 3,232,961
Patented Feb. 1, 1966

3,232,961
16α-HALOMETHYL PREGNANES AND DERIVATIVES THEREOF
Emanuel Kaspar, Berlin-Wilmersdorf, Rudolf Wiechert, Berlin-Lichterfelde, and Martin Schenck, Berlin-Frohnau, Germany, assignors to Schering A.G., Berlin, Germany
No Drawing. Filed Feb. 19, 1960, Ser. No. 9,720
Claims priority, application Germany, Nov. 23, 1957, Sch 23,159; Mar. 5, 1959, Sch 25,651; Mar. 25, 1959, Sch 25,778; Apr. 23, 1959, Sch 25,936
15 Claims. (Cl. 260—397.3)

The present invention relates to new steroid derivatives and to the production of the same, and more particularly to steroid derivatives which are particularly useful intermediate products for the production of technically valuable known steroids and in the production of steroids which are as yet unknown but which may have valuable activity.

This application is a continuation-in-part of our copending application 774,829, filed November 19, 1958, now abandoned, for "Steroid Derivatives."

Methyl steroids have in recent times become of increasing importance and interest in pharmacology. Various methods have been set forth in the literature of producing methyl steroids, these methods, however, only being suitable for the introduction of the methyl group into specific places in the molecules of various specific steroids. It has therefore been desirable to find new intermediates which make it possible to introduce methyl groups into different positions in different steroid molecules.

It is therefore a primary object of the present invention to provide a new series of steroid derivatives.

It is another object of the present invention to provide a new series of steroid derivatives which are themselves intermediate for the production of methyl steroids and other steroid derivatives which have important pharmacological properties.

It is still another object of the present invention to provide for the production of new steroid derivatives which themselves have valuable pharmacological activity in view of the properties of the compounds as having progestational activity, as having corticoid activity, and other activities of the type of known steroids.

It is yet another object of the present invention to provide for the production of the new compounds of this invention.

Still other objects and advantages of the present invention will be apparent from a further reading of the specification and of the appended claims.

With the above objects in view, the present invention mainly comprises a compound selected from the group consisting of compounds of the following general formula:

(I)
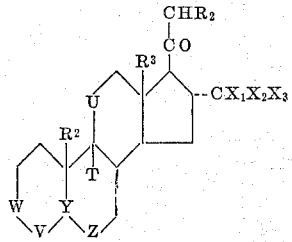

and compounds of the following general formula:

(II)
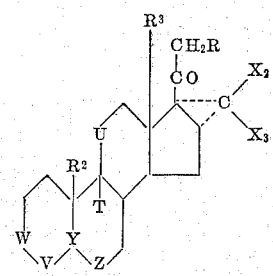

wherein $X_1$ is selected from the group consisting of hydrogen and halogen, wherein $X_2$ is selected from the group consisting of hydrogen and halogen, wherein $X_3$ is a halogen, wherein R is selected from the group consisting of hydrogen, hydroxyl, O-alkyl wherein the alkyl is a lower alkyl, and O-acyl wherein the acyl is derived from a lower aliphatic carboxylic acid, wherein $R^2$ is selected from the group consisting of hydrogen and methyl, wherein $R^3$ is selected from the group consisting of hydrogen and methyl, wherein U is selected from the group consisting of —CH$_2$—, —CHOacyl- wherein the acyl is derived from a lower aliphatic carboxylic acid, —CHOH— and —CO—, wherein T is selected from the group consisting of hydrogen and fluorine, wherein W is selected from the group consisting of —CH$_2$—, —CO—, —CHOR$^4$—, wherein $R^4$ is selected from the group consisting of hydrogen, lower alkyl, lower acyl, the group

wherein $R^5$ and $R^6$ are each individually selected from the group consisting of lower alkyl, and together of alkylene groups, and the group

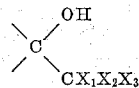

wherein $X_1$, $X_2$ and $X_3$ have the same definitions as above, and wherein the group

is selected from the group consisting of

and

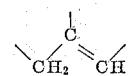

The production of compounds according to Formula I wherein $X_1$, $X_2$ and $X_3$ are all halogens, i.e. fluorine, chlorine, bromine or iodine, preferably chlorine or bromine, is based upon a novel haloform reaction. Thus, haloform addition products of 3-ketosteroids, as intermediate products for synthesis in this steroid series, have been formed, preferably in the presence of potassium tertiary butylate. The haloform reaction in such cases results in the addition of the trihalogen-methyl group onto the 3-keto group, and this trihalogen-methyl group can then in known manner be hydrogenated to the methyl group to form the 3-methyl-3-hydroxy steroid.

It has been discovered that the corresponding 20-methyl-20-hydroxy steroid cannot be produced in this manner since the 20-ketosteroid in general under the same reaction conditions will not form the corresponding addition product with haloforms.

However, it has been further discovered according to the present invention that the α,β-unsaturated 20-ketosteroids such as 16-dehydro-5-pregnene-3-ol-20-one can under the same reaction conditions react with haloforms, however, in a surprising and entirely different manner in that the haloform does not add onto the keto group, but rather onto the carbon-carbon double bond which is in conjugation thereto. Thus, for example, in the case of the above named compound as starting material, the addition is on the $\Delta^{16}$-double bond.

The process of producing compounds of the present invention according to Formula I above wherein $X_1$, $X_2$ and $X_3$ are all halogens, e.g. the production of a compound having the following general formula:

(III)

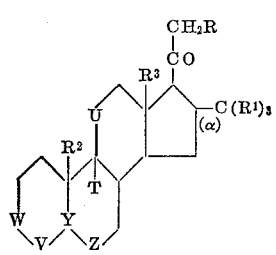

wherein R is hydrogen, hydroxyl, O-alkyl (lower) or O-acyl (lower aliphatic carboxylic), wherein $R^1$ is a halogen, wherein $R^2$ is selected from the group consisting of hydrogen and methyl, wherein $R^3$ is selected from the group consisting of hydrogen and methyl, wherein U is selected from the group consisting of —CH$_2$—, —CHOH—, —CHOacyl- and —CO—, wherein T is selected from the group consisting of hydrogen and fluorine, wherein W is selected from the group consisting of —CH$_2$—, —CO—, —CHOR$^4$—, wherein $R^4$ is selected from the group consisting of hydrogen, alkyl and acyl radicals, and

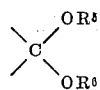

wherein $R^5$ and $R^6$ are selected from the group consisting of alkyl radicals and members which with each other form radicals selected from the group consisting of alkylene and

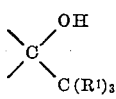

wherein $R^1$ has the same definition as above, and wherein the group

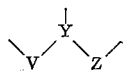

is selected from the group consisting of

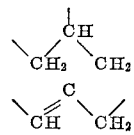

and

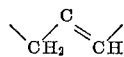

which comprises reacting a haloform with a compound having the following general formula:

(IV)

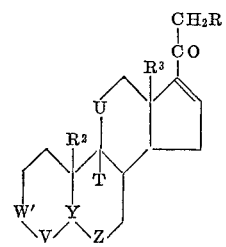

wherein R, $R^2$, $R^3$, T, U, V, Y and Z have the same definitions as above; and wherein W' is selected from the group consisting of —CH$_2$— and —CHOR$^4$—, $R^4$ being selected from the group consisting of hydrogen, alkyl and acyl radicals,

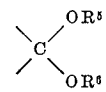

wherein $R^5$ and $R^6$ are selected from the group consisting of alkyl radicals and members which with each other form an alkylene radical, —CO— and

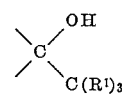

wherein $R^1$ has the same definition as above.

This results in the production of an important new series of intermediates which can be further reacted in known manner to form the corresponding methyl steroids. Thus, the trihalogen-methyl group which has been introduced into the steroid molecule can be reduced to the methyl group, for example by means of hydrogen in the presence of Raney nickel.

The following equation illustrates the production of new intermediate compounds of the present invention, and the further conversion of such intermediate compounds by hydrogenation to the corresponding methyl steroid. The starting material for the following reaction is 16-dehydro-pregnenolone:

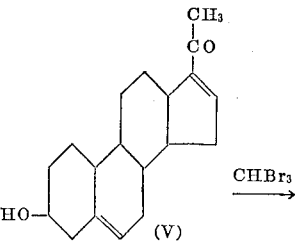

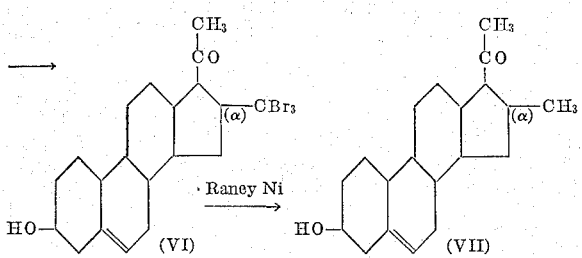

In order that the haloform reaction according to the present invention results in the addition of the trihalogenmethyl group to the $\Delta^{16}$-double bond only it is necessary that there should not be free haloform reactive keto groups in the molecule, for example in the 3-position. If it is desired that the final compound should have such a keto group in the molecule, for example in the 3-position, then it is possible to introduce such keto group into the molecule after the haloform reaction. Thus, for example, in the above-indicated equations the 3-position hydroxyl group can be converted to a keto group in the 3-position by oxidation, for example according to the method of Oppenauer, after the haloform reaction. The importance of the haloform addition products of the present invention as intermediates in steroid chemistry may be seen by the fact that the 16α-methyl-3-keto-steroid which may be produced from the intermediate compound of the present invention by hydrogenation of the 16α-tribromomethyl group to the corresponding methyl group, has an action which is two to three times greater than the action of progesterone.

Proof of the fact that the haloform reaction according to the present invention results in the addition of the trihalogen-methyl group to the 16-carbon atom is apparent from the following data with respect to 16-methyl-3-ketosteroid produced from the 16-tribromomethyl-pregnenolone of the present invention:

Since the finally obtained product is a 16-methyl-3-ketosteroid which differs in its physical data from the known 17α-methylprogesterone or the isomeric 17β-isoprogesterone, the methyl group introduced into the molecule by the process of the present invention cannot be in the 17-position. The presence of a 16,17-methylene compound is found to be clearly improbable by examination of the infrared spectrum of the compound. Therefore, the newly introduced methyl group must be in the 16-position. Furthermore, by comparison it is found to be in the α-position, i.e. a 16α-methyl steroid.[1]

The reaction according to the present invention of an α,β-unsaturated 20-ketosteroid with a haloform, preferably with bromoform or chloroform, is preferably carried out at low temperatures with the haloform dissolved in a suitable organic solvent therefor such as benzene or, most preferably, a mixture of tertiary butanol and tetrahydrofurane in the presence of an alkali metal alcoholate, most preferably potassium tertiary butylate.

Thus, the produced 16-trihalomethyl steroids can be reduced to 16-methyl steroids.

To review the above reaction for the production of 16-methyl steroids, a 20-keto steroid is reacted with a haloform such as bromoform or chloroform in the presence of an alkali metal alcoholate to form the corresponding 16-trihalogen-methyl steroid, and the latter is subsequently reduced in known manner to the corresponding 16-methyl steroid. The intermediate compounds of the invention, namely the 16-trihalogenmethyl steroids have considerable value as intermediates in the production of 16-methyl steroids which have an activity of essentially the same kind as the corresponding steroids lacking the 16-methyl group, i.e. a progestational or adrenocorticosteroid activity, and other properties which make them extremely important from the pharmacological standpoint.

Besides their considerable value as intermediates in the production of 16-methyl steroids the 16-trihalogen-methyl steroids themselves already possess the above mentioned activities of the corresponding 16-methyl steroids to a diminished degree.

In accordance with a further embodiment of the present invention steroids having the above mentioned activities sometimes even to a higher degree than the corresponding 16-methyl steroids are produced, as well as intermediates in the production of other valuable steroids, by hydrogenation of the 16-trihalogen-methyl steroids to reduce them, however, according to this embodiment, only to the corresponding dihalomethyl-steroids or monohalomethyl steroids. This thus results in the production of compounds according to Formula I above wherein both $X_2$ and $X_3$ are halogens.

Methods for the stepwise partial exchange of individual halogen atoms of trihalomethyl compounds with hydrogen by means of reducing agents, particularly by catalytically activated hydrogen using selective catalysts are per se known. The application of these methods to trihalomethyl steroids requires the observation that besides the trihalomethyl group in the molecule, still other groups which are sensitive to reducing agents such as keto groups or carbon-carbon double bonds are present in the molecule. It is therefore necessary to consider these groups in choosing among the reducing agents. However, reduction methods of greatly varying degree are known in steroid chemistry so that for any given case it is almost always possible to find a suitable method of reduction. In difficult cases, achievement of the desired results may be facilitated by a suitable choice of the particular trihalomethyl group which is to be introduced in the first stage of the process. This is done by using instead of a unitary haloform at the beginning of the process a mixed haloform in order to take advantage of the difference in the holding strength of the various halogens during the subsequent halogenation.

Thus, in trihalomethyl steroids, for example, bromine atoms may be more easily split off than chlorine atoms which in turn are more easily split off than fluorine atoms. By suitable choice of the trihalomethyl group which is to be introduced in the first stage of the process, and if necessary by choice of various halogen atoms, it is possible to produce the corresponding dihalogen compounds or monohalogen compounds, and if desired, also dihalogen compounds with two different halogen atoms in the group.

Likewise, by suitable choice of the conditions of reduction it is possible to replace either one or two halogen atoms of the trihalomethyl compound by hydrogen.

Furthermore, it is also possible, as indicated previously in connection with the production of the trihalomethyl compounds, to protect sensitive groups during the course of the reaction by blocking these groups, or to introduce such groups into the molecules according to known methods of steroid chemistry only after the production of the dihalomethyl compound or the trihalomethyl compound. Thus, for example, it is possible to convert a 3-position hydroxyl group into a 3-keto group by oxidation in known manner only after reduction of the trihalomethyl group to the desired dihalomethyl group or monohalomethyl group.

---

[1] Cf. Marker, Journ. Amer. Chem. Soc., vol. 64 (1942), p. 1280; Romo, Chem. Abstr., vol. 48 (1954), p. 9399.

The following series of formulas illustrates the above reactions:

easily converted in a smooth reaction to 16α-halomethyl steroids, particularly monohalomethyl steroids. This re-

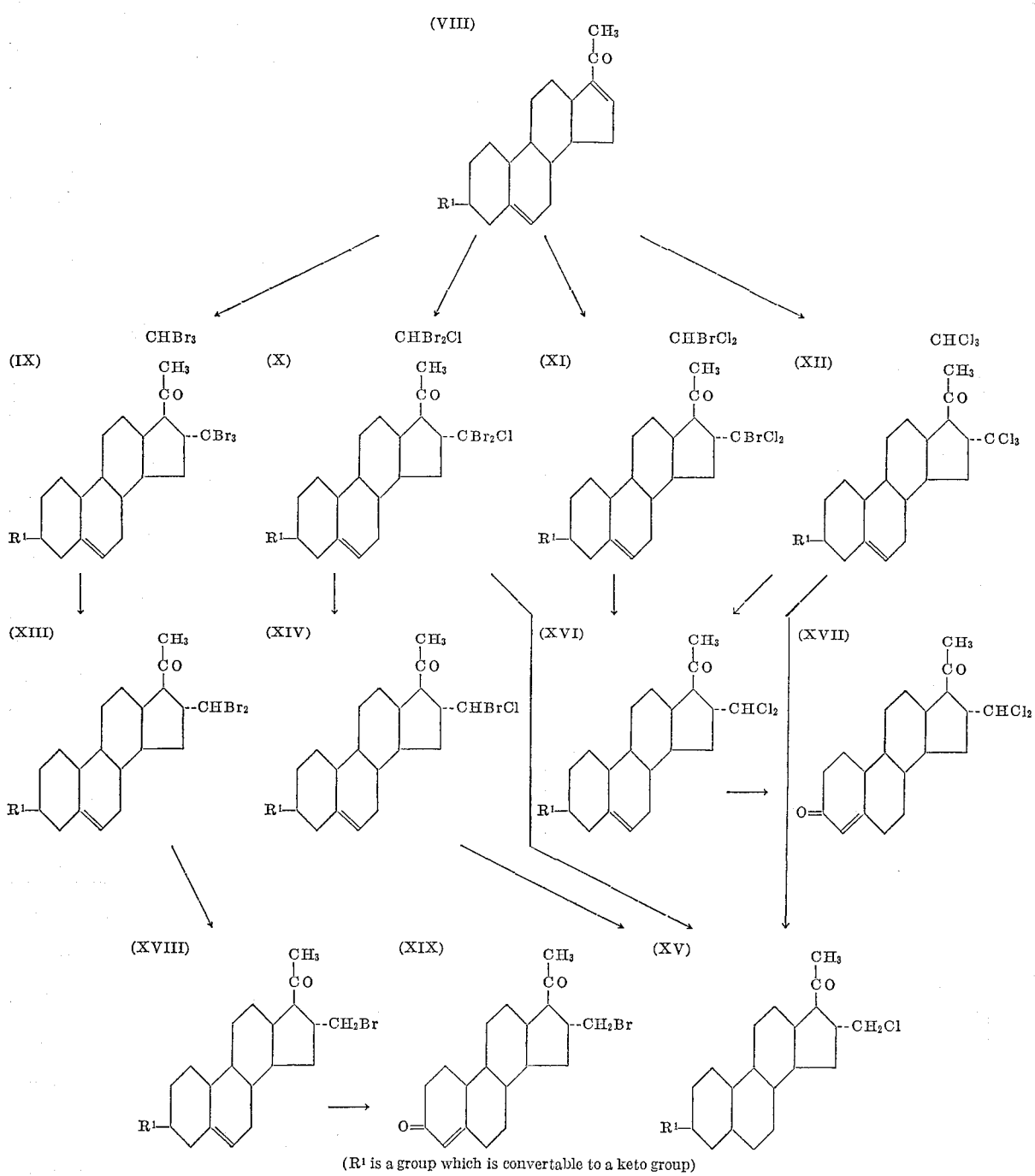

(R¹ is a group which is convertable to a keto group)

Although the above method is suitable for the production of 16-dihalomethyl steroids and 16-monohalomethyl steroids, the above partial dehalogenation method does not give satisfactory yields in all cases. Thus, for example, the production of 16α-chloromethyl steroids involves considerable difficulties.

In view of the value of 16α-halomethyl steroids as intermediate products for synthesis in the steroid chemical series and as well as their physiological activities as progestational or adrenocorticosteriod hormones, further development was made to find a still better method of producing these compounds.

It has been found that 16,17-methylene steroids by reaction thereof with a hydrogen halide can be very action proceeds in accordance with the following equation:

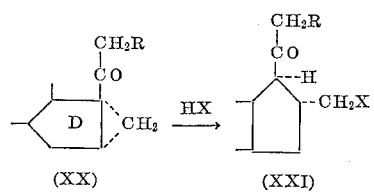

wherein D is the 5-membered ring of a steroid molecule.

It is quite surprising that the reaction proceeds as set forth above since hitherto known splitting reactions of cyclopropane rings in the steroid system proceeded in a different fashion.

Thus, Shoppee in Journal of the Chemical Society of London, 1952, page 1786, set forth a reaction in an analogous tricyclic system in the A-ring of the steroid system, as follows:

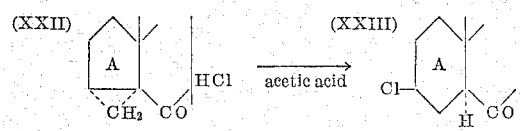

By complete analogy, it would be expected that in the case of the present invention process an opening of the cyclopropane ring would be expected with simultaneous disappearance of the 5-membered ring. The discovery that instead of what would be expected, the 5-member ring remains and the 6-member ring disappears, is most surprising.

Recently, Haddad in the Journal of the Chemical Society of London, 1959, page 769, stated that in the A-ring too a splitting of the tricyclic system with the obtaining of a 5-member ring can proceed according to the following equation:

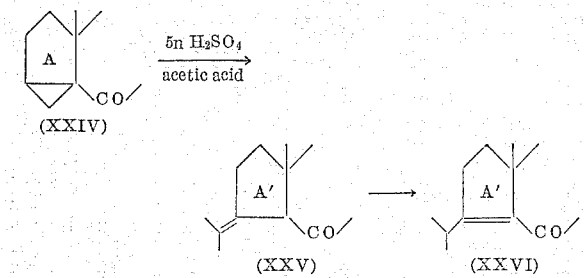

In the above case, however, there is no addition of the ring splitting acid to the steroid system so that this does not constitute a complete analogy with the process of the present invention.

The structure of the products produced according to this method is found to be the same as that of the products produced by partial dehalogenation of the corresponding 16α-trihalomethyl steroid so that is is clear that the compound produced is a 16α-monohalomethyl steroid. Furthermore, it is also found to be this compound due to the identity of its completely dehalogenated compound to the already known 16α-methyl steroids.

It would appear upon first consideration that this particular method of producing the monohalomethyl steroids is not greatly advantageous because the 16,17-methylene steroids aside from their inadequate produtcion by pyrolysis of the corresponding diazomethylene steroids (note Sandoval, Journal of the American Chemical Society, vol. 73, page 2383, 1951) can themselves again be obtained from the 16α-monohalomethyl steroids preferably by splitting with hydrogen halides. However, when it is realized that the 16α-monohalomethyl steroids can only be obtained with specific halogens, preferably bromine, from the corresponding trihalomethyl steroid by means of partial dehalogenation in a smooth reaction, whereas in the case of splitting the obtained 16,17-methylene compound by the addition of a hydrogen halide this can be accomplished without consideration of the particular hydrogen halide while still obtaining a good yield of the 16α-monohalomethyl steroid, the advantages of proceding in this manner are quite clear.

In addition to the above, the present invention also provides for the production of new compounds corresponding to Formula II above, that is, 16,17-dihalomethylene-20-keto steroids and 16,17-monohalomethylene-20 keto steroids, as well as to a new and superior method of producing these compounds and also 16,17-methylene-20-keto steroids.

Prior to the present invention 16,17-methylene-20-keto steroids were only produced by the pyrolysis of the corresponding diazomethylene steroid, this process resulting in the production besides the above set forth main product of also $\Delta^{16}$-unsaturated 16-methyl seroids in small yield as side products. This is the method described in the Sandoval article mentioned above.

According to the present invention, 16,17-dihalomethylene-20-keto steroids and 16,17-monohalomethylene-20-keto steroids which are themselves valuable steroid compounds having progestational or adrenocorticosteroid activity and which in addition are valuable intermediate products in the production of 16,17-methylene-20-keto steroids can be produced and obtained in good yield. This is achieved according to the present invention by subjecting a 16-halomethyl-20-keto steroid to the action of a hydrogen halide-splitting agent.

The reaction proceeds in acocrdance with the following equation:

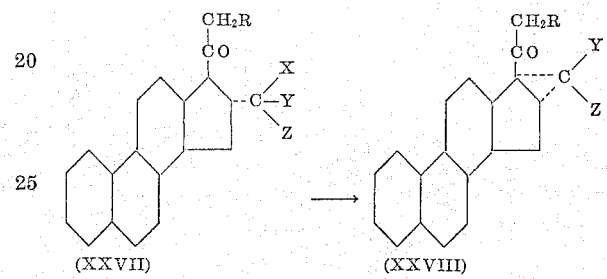

wherein X is a halogen such as chlorine, bromine or iodine, Y is hydrogen or a halogen, and Z is hydrogen or a halogen.

This invention is applicable to the nor-steroids as well as to the actual steroids themselves.

The 16-halomethyl-20-keto steroids which are used as starting materials may be produced as described above and may contain in addition to the groups which take part in the reaction other groups which are sensitive to the action of agents used for splitting off hydrogen halides.

Among the suitable agents for splitting off hydrogen halides are preferably alkali metal hydroxides and ammonium hydroxides or alkali metal alcoholates in alcoholic solution such as sodium methylate or potassium methylate in methanol, or organic bases such as collidine. The action of the agent preferably proceeds at increased temperatures, preferably at the boiling temperature of the alcohol or the base. It is advantageous to operate with the exclusion of oxygen.

In the case of groups which are sensitive to the agents used for splitting off of hydrogen halides, it is possible to first form intermediates so as to block these groups in per se known manner, or as desired, it is also possible to introduce such groups into the molecule only after the splitting off of the hydrogen halide to form the 16,17-halomethylene or methylene compound, and in this manner to obtain the finally desired end product.

As proof of the suitability of the products of the present invention for pharmacological purposes, it was found that while the known 16,17-methylene-progesterone (which can be produced in superior manner in accordance with the method of this invention) is eight times stronger than progesterone in the Clauberg test when given subcutaneously, the new compounds of this invention, e.g. 16,17-dibromomethylene-progesterone, which upon subcutaneous application only equals the activity of progesterone when given by peroral application, the activity of progesterone is surpassed several times. Thus, these 16,17-halogenmethylene-20-keto steroids are themselves valuable products, and in addition, are extremely valuable as intermediate products in the production of compounds such as 16,17-methylene progesterone, for example, by the Oppenauer reaction on 16,17-methylene-pregnenolone.

The following examples are given to further illustrate the present invention. The scope of the invention is not, however, meant to be limited to the specific details of the examples.

Example I 4.49 g. of potassium tertiary butylate dissolved in a mixture of 50 cc. of dry tetrahydrofurane and 60 cc. of tertiary butanol is added dropwise during a time period of 30 minutes to 6.29 g. of 16-dehydropregnenolone in 100 cc. of dry tetrahydrofurane and 11.5 cc. of bromoform under ice cooling and under nitrogen. The reaction mixture is subsequently stirred for an additional 5 minutes under ice cooling. It is then mixed with water, the reaction mixture is shaken with methylene chloride and this solution is washed with water.

The solution is then dried over sodium sulfate and subsequently concentrated under a nitrogen atmosphere under vacuum to dryness. The remaining residue is rubbed with 75 cc. of pentane and the mixture is subjected to suction filtration. Recrystallization from acetone results in the obtention of 5.3 g. of 16α-tribromomethyl-$\Delta^5$-pregnenolone have the following structural formula:

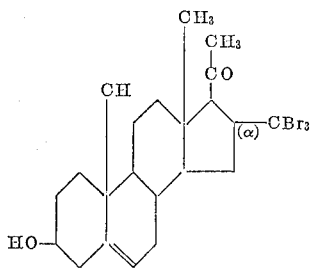

This compound melts at 231.5° C. (with decomposition). Further recrystallization results in the pure product having a melting point of 260° C. with decomposition. (The decomposition melting point is in this case determined according to the method of Boehme as described in Deutsche Apothekerzeitung, 95, 153, 1955.) There is no ultraviolet absorption at 240 mμ.

The following illustrates the conversion of the above compound to methyl steroids:

5.25 g. of the tribromo product are shaken in 93 cc. of ethanol, 3.0 g. of potassium acetate and 35.1 g. of Raney nickel (alkaline) under hydrogen until there is practically no longer any absorption of hydrogen. The product is then filtered from the catalyst, the filtrate is evaporated under vacuum to dryness, the residue is rubbed with water, and subjected to suction filtration. The compound which is recrystallized from methanol is 16α-methyl-pregnenolone. The compound has a melting point of 176–179° C. The yield is 2.1 g. Further recrystallization results in the compound having a melting point of 184–187° C.

1.8 g. of the obtained 16α-methyl-pregnenolone is dissolved in 60 cc. of toluene. 17 cc. of cyclohexanone is added. Several cc. are distilled off to remove moisture. 1.73 g. of aluminum isopropylate which is dissolved in 7 cc. of dried toluene is added during a time period of 5 minutes, and then the reaction mixture is heated to boiling under very mild distillation conditions for 45 minutes. After working up the reaction mixture in the usual manner by steam distillation, subsequent shaking with methylene chloride, washing of the solution with water and drying with sodium sulfate, the crude product which is obtained after concentrating the methylene chloride solution is rubbed with pentane. In this manner, there is obtained 1.46 g. of 16α-methyl-progesterone having a melting point of 127–132° C. Upon recrystallization from isopropyl ether, the melting point is 136.5–138° C.

$[\alpha]_D$: +172° ($CHCl_3$). Ultraviolet absorption: $\epsilon_{241}$=17,300. Upon infra-red spectrum the following bands appear:

5.96μ=conjugated 3-keto groups
6.19μ=$\Delta^4$-double bond
5.86μ=unconjugated 20-keto group

Example II 314 mg. of $\Delta^{5,16}$-pregnadiene-3β-ol-20-one are dissolved in 9 cc. of absolute tetrahydrofurane and 0.59 cc. of chloroform are added thereto. A solution of 673.3 mg. (6 millimoles) of potassium tertiary butylate in 5 cc. of tetrahydrofurane and 6 cc. of tertiary butanol are added dropwise under stirring during a time period of 20 minutes, the addition being made under nitrogen and at a temperature of −20° C. The reaction mixture is then further stirred for 10 minutes while warming to 0° C.

The reaction mixture is introduced into 100 cc. of water, extracted with methylene chloride, and this solution washed with water until neutral. The solution is subsequently dried over sodium sulfate and concentrated to dryness under vacuum at a temperature of 30° C. The thus obtained crude product is again subjected to the above reaction two times.

Upon absorption in neutral aluminum oxide and eluation with carbon tetrachloride there is obtained 16α-trichloromethyl-$\Delta^5$-pregnane-3β-tertiary-butoxy-20-one having a melting point of 114/115–117° C. $[\alpha]_D^{20}$: +25° ($CHCl_3$). Ultraviolet spectrum: $\epsilon_{209}$=2200 ($\Delta^5$-double bond). Infra-red spectrum shows the following bands:

5.84μ=unconjugated 20-keto group
9.09μ and 9.24μ=ether band
12.77μ and 13.47μ=carbon-chloride bands

Example III 2.25 g. of potassium tertiary butylate dissolved in 25 cc. of dry tetrahydrofurane and 30 cc. of tertiary butanol is added dropwise during a time period of 30 minutes under ice cooling and nitrogen atmosphere to 3.1 g. of $\Delta^{16}$-pregnene-3α-ol-11,20-dione in 50 cc. of dry tetrahydrofurane and 5.25 cc. of bromoform. The reaction mixture is stirred for an additional 15 minutes under ice cooling. The working up proceeds as in Example I to give after rubbing with pentane and acetone crude 16α-tribromomethyl-pregnene-3α-ol-11,20-dione.

2.5 g. of this tribromo product are shaken in 50 cc. of ethanol with 1.5 g. of potassium acetate and 17 g. of Raney nickel (alkaline) under hydrogen until there is practically no further absorption of hydrogen. Working up as in Example I results in the production of 16α-methyl-pregnane-3α-ol-11,20-dione having a melting point of 153–155° C. $[\alpha]_D$ +108° ($CHCl_3$).

Example IV 20.00 g. of 16α-tribromomethylene-pregnenolone (produced according to Example I above) in 354 cc. of methanol are hydrogenated with 3.54 g. of platinum oxide and with the addition of 7.6 g. of potassium acetate. The hydrogenation is stopped after two equivalents of hydrogen are taken out, the catalyst is filtered off and the solution concentrated under vacuum. The residue is taken up in methylene chloride, washed with water, dried, and the solvent distilled off under vacuum. The crude product is taken up with methylene chloride:carbon tetrachloride in a ratio of 3:1 onto silica gel (10% water) and subjected to chromatography.

After recrystallization from isopropyl ether, the resulting 16α-monobromomethyl-pregnenolone has a melting point of 177–178° C.

UV absorption: $\epsilon_{204}$=2,960.

2.36 g. of 16α-bromomethyl-pregnenolone with 100 cc. of absolute toluene and 20 cc. of cyclohexanone are heated to boiling, several cc. distilled off, 1 g. of aluminum isopropylate dissolved in 10 cc. of absolute toluene are added dropwise, and heated under refluxing for 45 minutes.

After steam distillation the residue is extracted with methylene chloride, washed with water, dried and concentrated under vacuum. 2.5 g. of the substance are taken up onto a celite column with cyclohexene:methylene chloride in a ratio of 3:1, and subjected to chromatography.

The resulting 16α - monobromomethyl - progesterone after recrystallization from acetate melts at 140–142° C.
UV absorption: $\epsilon_{240m\mu}=14,500$.

Example V 673 mg. of potassium tertiary butylate in 9 cc. of tertiary butanol and 7 cc. of absolute tetrahydrofurane are added dropwise to 943 mg. of 16-dehydropregnenolone in 24 cc. of absolute tetrahydrofurane and 3.12 g. of dibromochloromethane under stirring, cooling to −20° C. and under nitrogen during a time period of 30 minutes. The reaction mixture is stirred for an additional 15 minutes at −20° C. diluted with methylene chloride, washed with water until neutral, dried, and evaporated under vacuum.

The residue was rubbed with pentane, filtered under suction, and recrystallized from acetone.

The resulting 16α-dibromochloromethyl-pregnenolone melts at 211–213° C. with decomposition.

$[\alpha]_D^{25}$: +9.1° ($CHCl_3$).

UV absorption: $\epsilon_{205m\mu}=4,700$.

60 mg. of platinum oxide, 20 cc. of absolute tetrahydrofurane and 216 mg. of potassium acetate are prehydrogenated, 523 mg. of 16α-dibromochloromethyl-pregnenolone are added and hydrogenated. After the take up of 1 mole of hydrogen, the hydrogenation is terminated, the catalyst is filtered off, the reaction mixture is diluted with methylene chloride, washed with water, dried and evaporated under vacuum. After recrystallization from ethyl actate, the resulting 16α-bromochloromethyl-pregnenolone melts without decomposition at 205.5–209° C.

Example VI 4.00 g. of 3-(tetrahydro-2-pyranyloxy)-Δ$^{5,16}$-pregnadiene-20-one (melting point 164–165° C.) produced as in Example VIII, 50 cc. of absolute tetrahydrofurane and 4 cc. of dibromochloromethane are, under stirring, cooling to −20° C. and in a nitrogen atmosphere, reacted dropwise with 2.24 g. of potassium tertiary butylene in 30 cc. of tertiary butanol and 25 cc. of absolute tetrahydrofurane during 30 minutes, and further worked up as in Example V above.

After recrystallization from ethyl acetate as resulting 16α - dibromochloromethyl-3-(tetrahydro-2-pyranyloxy)-Δ$^5$-pregnene-20-one melts at 180.5–182° C., with decomposition.

$[\Delta]_D^{25}$: +15.6° ($CHCl_3$).

UV absorption: $\epsilon_{205m\mu}=3,990$.

607 mg. of 16α-dibromochloromethyl-3-(tetrahydro-2-pyranyloxy)-Δ$^5$-pregnene-20-one are hydrogenated with 60 mg. of platinum oxide and 216 mg. of potassium acetate in 10 cc. of ethanol and the hydrogenation is terminated after taking up of 2 millimols of hydrogen. The catalyst is filtered off, the filtrate is diluted with methylene chloride, washed with water, dried and evaporated under vacuum. After recrystallization from isopropyl ether the resulting 16α-chloromethyl-3-(tetrahydro-2-pyranyloxy)-Δ$^5$-pregnene-20-one melts at 149.5–150° C.

UV absorption: $\epsilon_{205m\mu}=3,100$.

830 mg. of 16-chloromethyl-3-(tetrahydro-2-pyranyloxy)-Δ$^5$-pregnene-20-one are dissolved in 25 cc. of methylene chloride and 10 cc. of methanol, reacted with 4 drops of concentrated hydrochloric acid, and permitted to stand for 1 hour at room temperature. After working up it is washed with water until neutral, dried and evaporated under vacuum.

After recrystallization from isopropyl ether the 16α-chloromethyl-pregnenolone melts at 182.5–184° C.

UV absorption: $\epsilon_{205m\mu}=2,800$.

Example VII 398 mg. of 3-(tetrahydro-2-pyranyloxy)-Δ$^{5,16}$-pregnadiene-20-one, produced as in Example VIII, and 0.41 cc. of bromodichloromethane in 5 cc. of dry tetrahydrofurane are reacted under stirring for 30 minutes at a temperature of −20° C. with 224 mg. of potassium tertiary butylate dissolved in 3 cc. of tertiary butanol and 2.5 cc. of tetrahydrofurane. After 15 minutes additional stirring at −20° C., as in Example V, it is worked up and the obtained crude product is again reacted two times as described above with bromodichloromethane. The obtained 16α-bromodichloromethyl - 3 - (tetrahydro-2-pyranyloxy)-Δ$^5$-pregnene-20-one is rubbed with pentane and after recrystallization from isopropyl ether decomposes at 188–189° C.

UV absorption: $\epsilon_{205}=4,040$.

408 mg. of 16α-bromodichloromethyl-3(-tetrahydro-2-pyranyloxy)-Δ$^5$-pregnene-20-one are dissolved in 5 cc. of methylene chloride and 2 cc. of methanol and after the addition of a drop of concentrated hydrochloric acid are allowed to stand for one hour at room temperature. It is subsequently diluted with methylene chloride, the solution is washed with water until neutral, dried over sodium sulfate and evaporated to dryness under vacuum. The thus obtained 16α-bromodichloromethyl-pregnenolone melts at 197–200° C. After recrystallization from methanol the substance exhibits a melting point of 198.5–201.5° C.

$[\alpha]_D^{24.5}$: +6.8° (c.=1; $CHCl_3$).

UV absorption: $\epsilon_{205}=3,700$.

717 mg. of 16α-bromodichloromethyl-pregnenolone are dissolved in 15 cc. of methanol and after the addition of 324 mg. of potassium acetate with 150 mg. of platinum oxide shaken until 1 equivalent of hydrogen, aside from that taken up by the catalyst, is taken up. The catalyst is then filtered off, water and methylene chloride are added, the methylene chloride solution again shaken with water and subsequently dried with sodium sulfate. After concentrating the solution the obtained crude product is isolated by chromatography over silica gel (containing 10% water) with methylene chloride:ethyl acetate in a ratio of 3:1. The obtained 16α-dichloromethyl-pregnenolone after recrystallization from methanol melts at 203.5° and is identical with the product obtained according to Example IX.

Example III 600 mg. of Δ$^{5, 16}$-pregnadiene-3β-ol-20-one to which are added a drop of phosphorus oxychloride in 15 cc. of absolute benzene and 15 cc. of 1,2-dihydropyrane for 16 hours at 37° C. The solvent is then distilled off under vacuum and the residue is rubbed with pentane and filtered off by suction. The resulting 3-(tetrahydro-2-pyranyloxy-Δ$^{5, 16}$-pregnadiene-20-one when recrystallized from isopropyl ether melts at 168–170° C.

UV absorption: $\epsilon_{239}=9010$ and $\epsilon_{205}=4770$.

206 mg. of the pyranyl ether are dissolved in 2.5 cc. of absolute tetrahydrofurane and 0.3 cc. of chloroform and the solution is added dropwise under nitrogen atmosphere at a temperature of −20° C. during a time period of 30 minutes to a solution of 350 mg. of potassium tertiary butylate in 2.5 cc. of absolute tetrahydrofurane and 3 cc. of tertiary butanol, while stirring. Thereupon, after warming to room temperature it is stirred for an additional 10 minutes. The reaction mixture is diluted with water, extracted with methylene chloride, and the methylene chloride phase is washed with water until neutral, dried over sodium sulfate and concentrated under vacuum to dryness. The remaining residue is recrystallized from hexane. The compound which is obtained is 16α-trichloromethyl-3-(tetrahydro-2-pyranyloxy-)-Δ$^5$-pregnene-20-one which melts at 191° C. with decomposition.

UV absorption: $\epsilon_{206}=3,560$.

1.2 g of 16α-trichloromethyl-3-(tetrahydro-2-pyranyloxy)-Δ$^5$-pregnene-20-one are dissolved in 16 cc. of methylene chloride and 45 cc. of methyl alcohol with the addition of 5 drops of concentrated hydrochloric acid and allowed to stand for 1 hour at room temperature. The reaction mixture is then diluted with methylene chloride and the methylene chloride phase is washed with water until neutral, dried with sodium sulfate and evaporated under vacuum to dryness.

The resulting compound 16α-trichloromethyl-$\Delta^5$-pregnene-3β-ol-20-one after recrystallization from isopropyl ether melts at 213–214° C. with recomposition.

UV absorption: $\epsilon_{205}=3,190$.

434 mg. of 16α-trichloromethyl-$\Delta^5$-$_{205}$-pregnene-3β-ol-20-one, 10 cc. of ethanol, 250 mg. of potassium acetate and 1 g. of Raney nickel are shaken and saturated with hydrogen. The catalyst is then filtered off, the reaction mixture diluted with methylene chloride, and the methylene chloride phase is washed with water until neutral and dried over sodium sulfate. The residue which remains upon evaporation of the vacuum is recrystallized from isopropyl ether. The resulting 16α-chloromethyl-$\Delta^5$-pregnene-3β-ol-20-one melts at 182-183° C.

UV absorption: $\epsilon_{205}=3,000$.

Example IX 217 mg. of 16α-trichloromethyl-$\Delta^5$-pregnene-3β-ol-20-one having a melting point of 213–214° C. (produced according to Example VIII above) in 10 cc. of ethanol with 108 mg. of potassium acetate and 50 mg. of prehydrogenated platinum oxide are shaken for hydrogenation until 1 equivalent of hydrogen has been taken up. The catalyst is filtered off, the reaction mixture is diluted with methylene chloride, the methylene chloride phase is washed with water and dried over sodium sulfate. The residue which remains upon concentration under vacuum is recrystallized from isopropyl ether. The resulting compound 16α-dichloromethyl-$\Delta^5$-pregnene-3β - ol - 20 - one melts at 201–205° C.

UV absorption: $\epsilon_{206}=2,910$.

1 g. of 16α-dichloromethyl-$\Delta^5$-pregnene-3β-ol-20-one are dissolved in 45 cc. of absolute toluene and with 9.6 cc. of cyclohexanone and 486 mg. of aluminum isopropylate oxidized according to the Oppenauer method and worked up as described in Example IV for the production of 16-α-bromomethyl-progesterone, and then recrystallized from isopropyl ether.

The resulting 16α-dichloromethyl-$\Delta^4$-pregnene-3,20-dione melts at 168° C.

UV absorption: $\epsilon_{239}=16,350$.

Example X 259 mg. of 16α - trichloromethyl - 3 - (tetrahydro-2-pyranyloxy)-$\Delta^5$-pregnene-20-one (produced as described in Example VIII), 10 cc. of ethanol, 6 cc. of tetrahydrofurane, 108 mg. of potassium acetate and 50 mg. of prehydrogenated platinum oxide are shaken for hydrogenation until 1 equivalent of hydrogen is taken up, and then the reaction mixture is further worked up as described in Example IX and recrystallized. The resulting compound is 16α-dichloromethyl-3-(tetrahydro-2-pyranyloxy)-$\Delta^5$-pregnene-20-one and melts at 163–164° C.

UV absorption: $\epsilon_{205}=3,320$.

Example XI 3.00 g. of 16α-bromomethyl-pregnenolone, produced according to Example IV, are heated under refluxing with 3.00 g. of sodium iodide in 90 cc. of dry acetone, the heating continuing for 4 hours. Methylene chloride is then added to the reaction mixture and then water. The methylene chloride phase is again washed with water, the solution is dried over sodium sulfate and after evaporation of the solvent, the obtained crude product is subjected to chromatography over silica gel (containing 1% water).

By means of chloroform there is obtained 16α-iodomethyl-pregnenolone which after rubbing with pentane melts at 141–145° C. After recrystallization from ethyl acetate the compound exhibits a melting point of 145.5–147° C.

Example XII 1.13 g. of 16α-tribromomethyl-pregnenolone in 20 cc. of ethanol are hydrogenated after the addition of 0.22 g. of potassium actate, with 80 mg. of platinum oxide. After taking up of 1 equivalent of hydrogen (exclusive of that taken up by the catalyst) the further working up proceeds as in Example IV. The obtained crude product is recrystallized from ethyl actate and 16α-dibromo-methyl-pregnenolone is obtained which melts at 202–204° C. with decomposition.

Example XIII 200 mg. of 16,17-methylene-5α-pregnane-3β-ol-20-one are dissolved in 20 cc. of methylene chloride and hydrogen bromide is passed through this solution until it is saturated. The reaction vessel is then closed and allowed to stand at room temperature for 30 minutes. The solution is then washed with water until neutral, dried with sodium sulfate and concentrated to dryness under vacuum. After rubbing the residue with isopropyl ether the compound 16α-bromomethyl-5α-pregnane-3β-ol-20-one is obtained which melts at 160–167° C. After further recrystallization the substance melts at 169–170° C.

$[\alpha]_D$: $+55°$ (CHCl$_3$)

Example XIV 300 mg. of 16,17-methylene-5α-pregnane-3β-ol-20-one are dissolved in 15 cc. of methylene chloride and hydrogen chloride is passed through this solution until it is saturated. The reaction vessel is then closed and allowed to stand at room temperature for 15 hours. After further working up as in Example XIII the crude product is rubbed with pentane and 16α-chloromethyl-5α-pregnane-3β-ol-20-one is obtained which after recrystallization from isopropyl ether melts at 170–173° C.

The yield is 167 mg. Further recrystallization from hexane results in the compound melting at 174–175° C.

$[\alpha]_D^{28}$: $+58°$ (CHCl$_3$)

Example XV 300 mg. of 16,17-methylene-5α-pregnane-3β-ol-20-one in 7.5 cc. of approximately 98% formic acid and 1.5 g. of potassium iodide are stored for 5 hours at 30° C. After normal working up by shaking with methylene chloride, washing with sodium thiosulfate and water, the obtained crude product is rubbed with pentane and there is thereby obtained 16α-iodomethyl-5α-pregnane-3β-ol-20-one-3-formiate which after recrystallization from isopropyl ether melts at 138–139° C.

$[\alpha]_D^{25}$: $+32.5°$ (chloroform)

Example XVI 200 mg. of 16,17-methylene-$\Delta^5$-pregnene-3β-ol-20-one with 5 cc. of approximately 98% formic acid and 1 g. of potassium iodide are stored for 5 hours at 30° C. and then further worked up as in Example XV. The obtained crude product is rubbed with pentane and there is thereby obtained 16α-iodomethyl-$\Delta^5$-pregnene-3β-ol-20-one-3-formiate which after thorough drying has a melting point of 141–144° C. The yield is approximately 90%.

Further recrystallization from methanol does not change the melting point.

$[\alpha]_D^{26}$: $+9.1°$ (CHCl$_3$)

Example XVII 200 mg. of 16,17-methylene-$\Delta^5$-pregnene-3β-ol-20-one are dissolved in 10 cc. of chloroform and saturated with hydrochloric acid as in Example XIV and then further worked up. The reaction time is 4 hours.

The obtained crude product is rubbed with pentane and there is thus obtained 16α-chloromethyl-$\Delta^5$-pregnane-3β-ol-20-one which after recrystallization from isopropyl ether melts at 184–186.5° C.

Example XVIII 250 mg. of 16α-bromomethyl-pregnenolone (produced according to Example IV above) are dissolved in 16 cc. of methanol, added dropwise to a solution of 100 g. of sodium in 30 cc. of methanol and heated under nitrogen atmosphere under refluxing for 2 hours.

For further working up the reaction mixture is neutralized with dilute acetic acid, the methanol is distilled off under vacuum, the residue is taken up in methylene chloride, the methylene chloride solution is washed until nuetral, dried and evaporated under vacuum. After recrystallization from ethyl acetate the resulting 16,17-methylene-pregnenolone melts at 211–212° C. and exhibits no depression with the authentic material.

UV absorption: $\epsilon_{207}=6,440$.

310 mg. of this compound are heated to boiling with 10 cc. of toluene permitting several drops to distill off. Thereupon 3 cc. of dry cyclohexanone are added thereto. A solution of 290 mg. of aluminum isopropylate in 1.2 cc. of absolute toluene are then added dropwise to the reaction mixture during a time period of 5 minutes and the reaction mixture is heated for 30 minutes to boiling during which time a small amount of toluene is allowed to distill off.

After steam distillation the residue is extracted with methylene chloride, the solution is washed with water, dried over sodium sulfate and then concentrated to dryness. After rubbing with pentane there is obtained 288 mg. of 16,17-methylene-progesterone having a melting point of 180–188° C. Recrystallization from ethyl acetate results in a pure product having a melting point of 190–191° C.

UV absorption: $\epsilon_{240}=16,580$.

Example XIX 2.0 g. of 16α-bromomethyl-Δ⁵-pregnene-3β-ol-20-one are heated to refluxing for 16 hours with 500 mg. of potassium hydroxide in 50 cc. of methanol. The solution is then diluted with water and the precipitated product is filtered off by suction. The resulting 16,17-methylene-Δ⁵-pregnene-3β-ol-20-one is recrystallized from ethyl acetate and melts at 203–208° C. The yield is 81% of the theoretical. A repeated recrystallization increases the melting point to 209–211° C.

Example XX 150 mg. of 16α-chloromethyl-Δ⁵-pregnene)3β-ol-20-one having a melting point of 183–185° C., produced according to Example VIII above, are heated under refluxing for 16 hours in 5 cc. of methanol and 28 mg. of potassium hydroxide. The solution is then diluted with water and the precipitated product is filtered off by suction. The resulting 16,17-methylene-Δ⁵-pregnene-3β-ol-20-one is recrystallized from ethyl acetate, melts at 208–211° C. and is identical with the product obtained according to Example XVIII.

Example XXI 456 mg. of 16α-iodomethyl-pregnenolone in 10 cc. of methanol along with 100 mg. of potassium hydroxide are heated under refluxing for 4 hours, after cooling mixed with water and then the entire reaction mixture is shaken with methylene chloride. After further working up as in Example XVIII the crude 16,17-methylene-pregnenolone, which after recrystallization from ethyl acetate melts at 210–212° C., is obtained and is found to be identical with the compounds produced according to Example XVIII.

Example XXII 7.3 g. of 16α-tribromomethyl-pregnenolone (produced according to Example I) are dissolved in 400 cc. of freshly distilled collidine and cooked under refluxing and under a nitrogen atmosphere for 5 hours.

After cooling the reaction product is poured into a mixture of 1 liter of 2 normal hydrochloric acid and the same amount of ice, extracted with methylene chloride, this solution is washed with water until neutral, dried over sodium sulfate and evaporated under vacuum. The residue is rubbed with pentane, filtered off under suction and recrystallized from acetone. The thus obtained 16,17-dibromomethylene-pregnenolone melts at 227.5–228° C. with decomposition.

UV absorption: $\epsilon_{206}=4300$.

2.0 g. of 16,17-dibromomethylene-prenenolone are dissolved in 100 cc. of toluene, 20 cc. of cyclohexanone are added, several cc. distilled off, 1.0 g. of aluminum isopropylate dissolved in 14 cc. of toluene are added dropwise and the reaction mixture is heated under refluxing for 45 minutes.

After steam distillation the residue is extracted with methylene chloride, washed with water, dried and evaporated under vacuum. The residue is recrystallized from acetone and the resulting compound, 16,17-dibromomethylene-progesterone melts at 164–165°.

UV absorption: $\epsilon_{239}=17,650$.

Example XXIII 3.42 g. 16α-tribromoethyl-pregnenolone are dissolved in 100 cc. of absolute toluene, 19.5 cc. of cyclohexanone are added thereto, several cc. are distilled off, 1 g. of aluminum isoproplyate dissolved in 10 cc. of toluene are added dropwise during a time period of 5 minutes and the reaction mixture is heated under refluxing for 45 minutes. After water distillation the residue is extracted with methylene chloride, washed with water, dried and evaporated under vacuum. The resulting 16α-tribromomethyl-progesterone melts after recrystallization from acetone at 204–205° C.

$[\alpha]_D$: +86.6° (chloroform).

UV absorption: $\epsilon_{240}=18,700$.

250 mg. of 16α-tribromomethyl-progesterone in 55 cc. of collidine are heated under refluxing under nitrogen atmosphere for 5 hours. After cooling, the reaction product is stirred in hydrochloric acid-containing ice water, filtered under suction and washed with water until neutral. After recrystallization from acetone the resulting 16,17-dibromomethylene-progesterone melts at 164–165° C.

UV absorption: $\epsilon_{239}=17,600$.

Example XXIV 3.6 g. of 16α-dibromochloromethyl-pregnenolone, produced as described above, are dissolved in 180 cc. of freshly distilled collidine and heated under refluxing under nitrogen atmosphere for 6 hours. Further working up proceeds as in Example XXII. The resulting 16,17 - bromochloromethylene - pregnenolone melts after recrystallization from acetone at 208° C. with decomposition.

$[\alpha]_D^{25}$: +0.77° (chloroform).

UV absorption: $\epsilon_{206}=3,520$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims:

What is claimed as new and desired to be secured by Letters Patent is:

1. 16α-bromomethyl-pregnenolone.
2. 16α-bromomethyl-progesterone.
3. 16α-bromochloromethyl-pregnenolone.
4. 16α-chloromethyl-pregnenolone.
5. 16α-dichloromethyl-pregnenolone.
6. 16α-iodomethyl-pregnenolone.
7. 16α-trichloromethyl-pregnenolone.
8. 16α-dichloromethyl-progesterone.
9. 16α-bromomethyl-5α-pregnane-3βol-20-one.

10. A method of producing a compound of the formula:

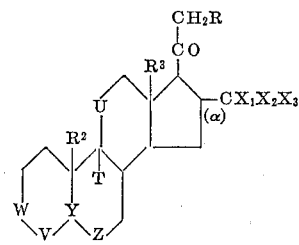

wherein $X_1$ is a halogen of molecular weight between 35 and 81, $X_2$ is a halogen of molecular weight between 35 and 81 and $X_3$ is a halogen of molecular weight between 35 and 128, where R is hydrogen, wherein $R^2$ is methyl, wherein $R^3$ is methyl, wherein U is selected from the group consisting of —$CH_2$—, and —CO—, wherein T is hydrogen, wherein W is selected from the group consisting of —CO—, and —$CHOR^4$— wherein $R^4$ is selected from the group consisting of hydrogen, lower alkyl, and lower acyl, and wherein the group

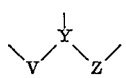

is selected from the group consisting of

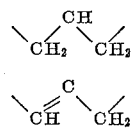

and

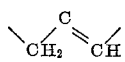

which comprises reacting a haloform with a compound of the formula

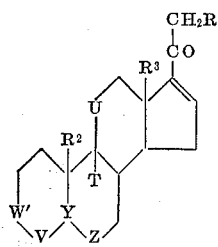

wherein R, $R^2$, $R^3$, U, T, V, Y and Z have the same definitions as above, and wherein W' is —$CHOR^4$—, wherein $R^4$ is selected from the group consisting of hydrogen, lower alkyl and lower acyl radicals.

11. A method of producing a compound of the formula:

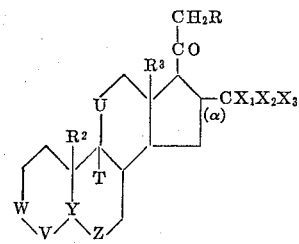

wherein $X_1$ is a halogen of molecular weight between 35 and 81, $X_2$ is a halogen of molecular weight between 35 and 81 and $X_3$ is a halogen of molecular weight between 35 and 128, wherein R is hydrogen, wherein $R^2$ is methyl, wherein $R^3$ is methyl, wherein U is selected from the group consisting of —$CH_2$—, and —CO—, wherein T is hydrogen, wherein W is selected from the group consisting of —CO—, and —$CHOR^4$— wherein $R^4$ is selected from the group consisting of hydrogen, lower alkyl, and lower acyl, and wherein the group

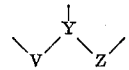

is selected from the group consisting of

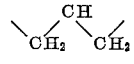

and

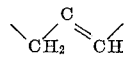

which comprises reacting a haloform selected from the group consisting of chloroform and bromoform with a compound of the formula

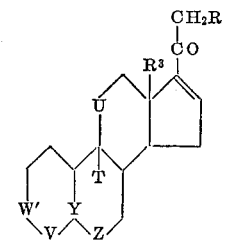

wherein R, $R^2$, $R^3$, U, T, V, Y and Z have the same definitions as above, and wherein W' is —$CHOR^4$—, wherein $R^4$ is selected from the group consisting of hydrogen, lower alkyl and lower acyl radicals.

12. A method of producing a compound of the formula:

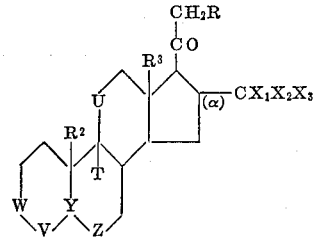

wherein $X_1$ is hydrogen, and wherein $X_2$ is a halogen of molecular weight between 35 and 81 and $X_3$ is a halogen of molecular weight between 35 and 128, wherein R is hydrogen, wherein $R^2$ is methyl, wherein $R^3$ is methyl, wherein U is selected from the group consisting of —$CH_2$—, and —CO—, wherein T is hydrogen, wherein W is selected from the group consisting of —CO—, and —$CHOR^4$—, wherein $R^4$ is selected from the group consisting of hydrogen, lower alkyl, and lower acyl, and wherein the group

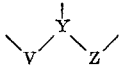

is selected from the group consisting of

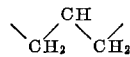

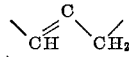

and

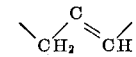

which comprises reacting a haloform with a compound of the formula

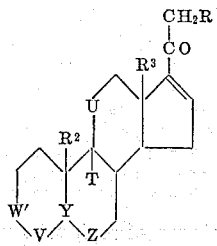

wherein R, $R^2$, $R^3$, U, T, V, Y, and Z have the same definitions as above, and wherein W' is —$CHOR^4$—, wherein $R^4$ is selected from the group consisting of hydrogen, lower alkyl and lower acyl radicals; and partially reducing the trihalomethyl group to a dihalomethyl group.

13. A method of producing a compound of the formula:

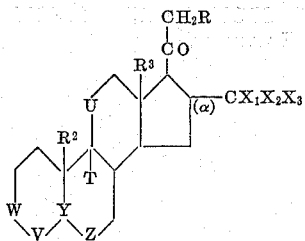

wherein $X_1$ is hydrogen, wherein $X_2$ is hydrogen and $X_3$ is a halogen of molecular weight between 35 and 128, wherein R is hydrogen, wherein $R^2$ is methyl, wherein $R^3$ is methyl, wherein U is selected from the group consisting of —$CH_2$—, and —CO—, wherein T is hydrogen, wherein W is selected from the group consisting of —CO—, and —$CHOR^4$—, wherein $R^4$ is selected from the group consisting of hydrogen, lower alkyl, and lower acyl, and wherein the group

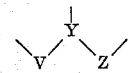

is selected from the group consisting of

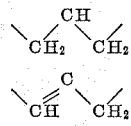

and

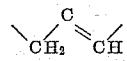

which comprises reacting a haloform with a compound of the formula

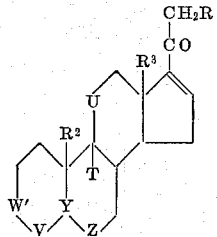

wherein R, $R^2$, $R^3$, U, T, V, Y and Z have the same definitions as above, and wherein W' is —$CHOR^4$—, wherein $R^4$ is selected from the group consisting of hydrogen, lower alkyl and lower acyl radicals; and partially reducing the trihalomethyl group to a monohalomethyl group.

14. A method of producing a compound of the formula:

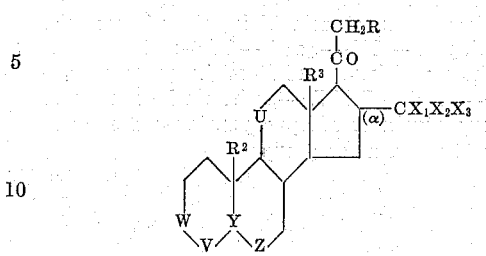

wherein $X_1$ and $X_2$ are each hydrogen, wherein X is a halogen of molecular weight between 35 and 128, wherein R is hydrogen, wherein $R^2$ is methyl, wherein $R^3$ is methyl, wherein U is selected from the group consisting of —$CH_2$—, and —CO—, wherein T is hydrogen, wherein W is selected from the group consisting of —CO—, and —$CHOR^4$—, wherein $R^4$ is selected from the group consisting of hydrogen, lower alkyl, and lower acyl, and wherein the group

is selected from the group consisting of

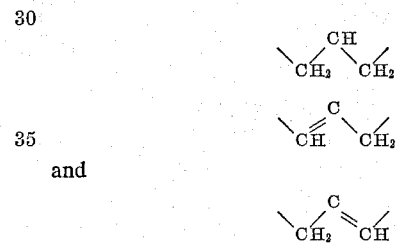

and which comprises reacting a compound of the formula:

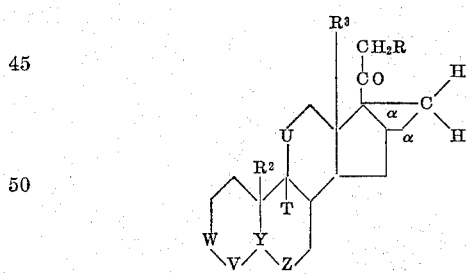

wherein R, $R^2$, $R^3$, U, T, W, V, Y and Z have the same definitions as above, with a hydrogen halide selected from the group consisting of hydrogen chloride, hydrogen bromide and hydrogen iodide.

15. A method of producing a compound of the formula:

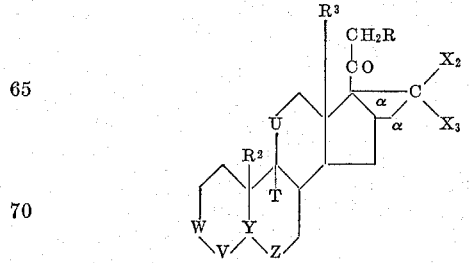

wherein $X_2$ is selected from the group consisting of hydrogen and halogen of molecular weight between 35 and 128, wherein $X_3$ is selected from the group consisting of hydrogen and halogen of molecular weight between 35 and 128, wherein R is hydrogen, wherein $R^2$ is methyl, wherein $R^3$ is methyl; wherein U is selected from the group consisting of —$CH_2$—, and —CO—; wherein T is hydrogen; wherein W is selected from the group consisting of —CO—, and —$CHOR^4$—, wherein $R^4$ is selected from the group consisting of hydrogen, lower alkyl, and lower acyl, and wherein the group

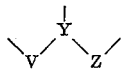

is selected from the group consisting of

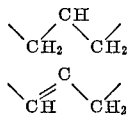

and

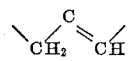

which comprises reacting a compound of the formula

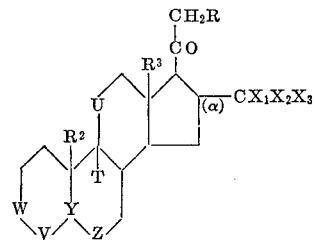

wherein $X_1$ is a halogen of molecular weight between 35 and 81, and wherein $X_2$, $X_3$, R, $R^2$, $R^3$, U, T, W, V, Y and Z have the same definitions as above with a hydrogen halide selected from the group consisting of hydrogen chloride, hydrogen bromide and hydrogen iodide and binding agent.

No references cited.

LEWIS GOTTS, *Primary Examiner.*

LESLIE H. GASTON, MORRIS LIEBMAN, IRVING MARCUS, *Examiners.*